March 10, 1931.   T. M. NODEN   1,795,882
GENERATOR CORE PUNCHING
Filed June 16, 1928

INVENTOR
Thomas M. Noden.
BY
ATTORNEY

Patented Mar. 10, 1931

1,795,882

UNITED STATES PATENT OFFICE

THOMAS M. NODEN, OF TURTLE CREEK, PENNSYLVANIA, ASSIGNOR TO WESTINGHOUSE ELECTRIC & MANUFACTURING COMPANY, A CORPORATION OF PENNSYLVANIA

GENERATOR-CORE PUNCHING

Application filed June 16, 1928. Serial No. 286,001.

My invention relates to dynamo-electric machines, and more particularly to stator-core punchings therefor.

Heretofore, stator-core punchings for assembling upon stator frames have had either dove-tail projections or recesses disposed around their outer peripheries. Stator frames which are provided with punchings of such type are costly because of the fact that extra machining is necessary, for providing a dovetail-assembling slot therein.

In the development of fabricated stator frames, special effort has been made to provide frames which will be as strong as the cast frames, previously utilized but with less material, as well as to provide frames which may be assembled more quickly. It has been the policy to get rid of as many boring and dove-tailing operations as possible. To aid in this development, core punchings have been assembled on rods, cylindrical or dove-tail-shape, that are mounted on longitudinal spacing members which are connected to the inner peripheries of two annular end-plates of the stator frame, or, in some cases, particularly in short frames where additional support of the rods between the ends of the frame is unnecessary, round rods or bolts have been located in holes in the annular end plates. In a more recent development, as described in a copending application of H. L. Barnholdt and J. L. Brown, filed May 17, 1928, Serial No. 278,396, and assigned to Westinghouse Electric & Manufacturing Company, the cylindrical rods are shown welded to the longitudinal spacers of a fabricated stator frame. By the utilization of such round rods, which are, incidentally, of standard structural shape, the machining necessary heretofore with dovetail slots is done away with. In such assemblies as have been known heretofore, the core punchings have had partially closed slots or recesses in their outer peripheries, and, upon assembling, had to be slipped over the ends of the supporting rods and moved the entire lengths thereof, resulting in a costly assembly on account of the extra time necessary for sliding the punchings down the rods. Such rods or bolts are often threaded at the ends, which increases the difficulty in sliding the punchings thereover.

It is an object of my invention to provide core punchings which may be assembled on the supporting rods without the necessity of slipping them along the lengths of the rods. In lieu of the former method of assembling, the punchings may be assembled from inside the core, near to the space which they will finally occupy.

Figure 1:
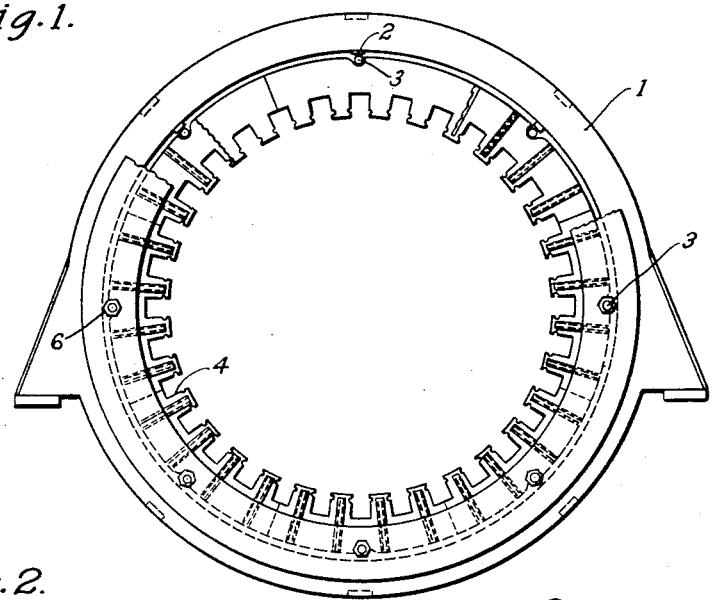
Figure 2:
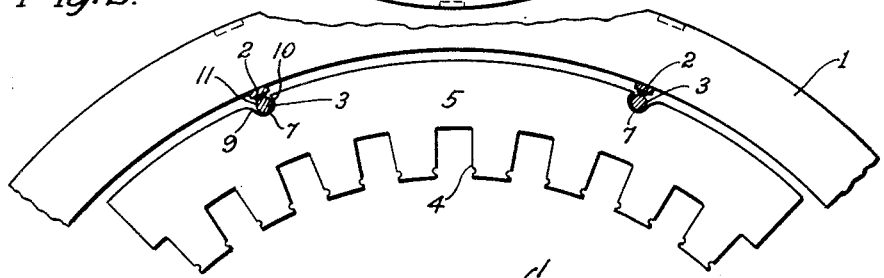
Figure 3:
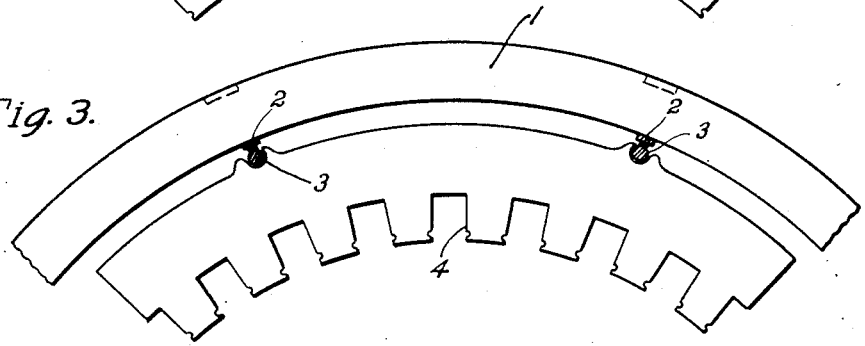

My invention resides in core punchings having novel-shaped recesses, the advantages of which will be more readily understood by reference to the accompanying drawing, wherein Figure 1 is an end elevational view of the stator of a dynamo-electric machine embodying the core punchings of my invention, Fig. 2 is a detail view, on a somewhat larger scale, showing one of my core punchings in its normal position, and Fig. 3 is a similar view of a modified form of my invention.

In Fig. 1, is shown a stator frame 1 which is of the fabricated type or of cast construction, which may have longitudinal-extending members 2 carried by the inner periphery thereof with core-supporting rods 3 welded thereto. In this manner, the laminated core 4 is carried by the frame 1 and comprises segmental core punchings 5 which are held in face-to-face relation by an end ring which is supported by the ends of the rods 2 having nuts 6 on their threaded ends.

Each core punching 5 has two supporting recesses 7 which are so shaped that the punchings may be readily assembled. A portion of the material is cut away from one side wall of each recess 7, to provide curved edge 9 opposite to a sharp clinching edge 10. The bolt or rod 3 is received through the mouth 11 of the recess. The two recesses 7 in each punching 5 are oppositely disposed in order that the clinching edges 10 shall engage the inner sides of the rods 3 and the curved edges shall be at the outer sides of the rods.

In the assembly operation, each punching is bowed sufficiently to permit the rods 3 to pass through the mouths 11 into the recesses 7 and is then permitted to resume its normal shape, which it will do because of its resiliency. When the punching is in its normal position the clinching portions 10 will hold it securely in that position.

In a large machine the core of which carries magnetic fluxes of high density, it is preferable to have the supporting rods outside the core. For such machines, a core punching, such as that shown in Fig. 2, is preferably utilized. In this modification, the bolts are disposed in recesses in portions which project radially beyond the body portions of the punchings.

In practicing my invention, I have provided a core punching which may be quickly assembled upon cylindrical rods, and I desire that only such limitations shall be imposed as are defined in the appended claims.

I claim as my invention:

1. A segmental punching for a magnetizable core of an electric machine, characterized by having winding-receiving slots substantially at its inner periphery and two supporting notches on its outer periphery adapted to be mounted on two supporting members on the machine, one of said notches opening diagonally toward the right and having a more nearly radial left-hand edge, and the other opening diagonally toward the left and having a more nearly radial right-hand edge, whereby two retaining edges are provided to extend in opposite directions toward the extreme back portion of the supporting rods.

2. The combination comprising an electrical machine having a plurality of equally spaced supporting rods disposed at equal distances from the central axis of the machine and parallel thereto, and a magnetizable core mounted on said supporting rods and composed of staggered segmental sections of laminations, each section being carried by two of the aforesaid rods and having slots for receiving, and partly surrounding, said two rods, each slot having a projecting edge that extends around a portion of the back of only one side of its associated rod and being cut away at the other side, the two slots being oppositely disposed to the right and left, respectively.

3. The combination comprising an electrical machine having a plurality of equally spaced supporting members constituting elongated dovetail projections disposed at equal distances from the central axis of the machine and parallel thereto, and a magnetizable core mounted on said supporting members and composed of staggered segmental sections of laminations, each section being carried by two of the aforesaid supporting members and having slots for receiving, and partly surrounding, said two supporting members, each slot having a projecting edge that extends around a portion of the back of only one side of its associated supporting member and being cut away at the other side, the two slots being oppositely disposed to the right and left, respectively, the aforesaid projecting edges of the said slots being on the side of the slot toward the center of the segmental sections, whereby the section may be applied to, and removed from, its two supporting members by temporarily bowing out the center of the section so as to reduce the distance betwen the two slots.

4. A segmental punching for a magnetizable core of an electric machine characterized by having winding-receiving slots substantially on its inner periphery and two supporting notches on its outer periphery, the right-hand notch opening diagonally toward the right and having a more nearly radial left-hand edge and the other opening diagonally toward the left and having a more nearly radial right-hand edge.

5. A segmental punching for a magnetizable core of an electric machine, characterized by having winding-receiving slots substantially on its inner periphery and two supporting notches on its outer periphery, the right-hand notch opening diagonally toward the right and the other opening diagonally toward the left.

6. An annular sectoral punching for a magnetizable core of an electric machine having winding-receiving means substantially at one circular periphery and two supporting notches on another circular periphery, characterized by the fact that said supporting notches are adapted to be mounted on two supporting members constituting elongated, longitudinally extending dovetail projections on the machine, the outer side of each of said notches opening diagonally away from the center of the punching and the inner side of each of said notches extending in dovetail fashion, whereby the inner sides of the two notches constitute two retaining edges adapted to extend in opposite directions toward the extreme back portions of the supporting members and to provide, in effect, two outwardly directed half-dovetail joints with the respective supporting members.

7. An annular sectoral punching for a magnetizable core of an electric machine having winding-receiving means substantially at one non-radial periphery and two supporting notches on another non-radial periphery, characterized by the fact that said supporting notches are adapted to be mounted on two supporting members constituting elongated, longitudinally extending dovetail projections on the machine, the outer side of each of said notches being open and the inner side of each of said notches extending in dovetail fashion, whereby the inner sides of the two notches constitute two retaining edges adapted to extend in opposite directions toward the extreme back portions of the supporting members and to provide, in effect, two outwardly directed half-dovetail joints with the respective supporting members.

8. A dynamo-electric machine having a plurality of spaced supporting members constituting elongated dovetail projections disposed parallel to the central axis of the machine, and a magnetizable core mounted on said supporting members and composed of staggered segmental sections of laminations, each section comprising a punching as defined in claim 1.

9. A dynamo-electric machine having a stator member comprising a plurality of equally spaced supporting members constituting elongated dovetail projections disposed at equal distances from the central axis of the machine and parallel thereto, and a magnetizable core mounted on said supporting members and composed of staggered segmental sections of laminations, each section comprising a punching as defined in claim 1.

10. A dynamo-electric machine having a plurality of spaced supporting members constituting elongated dovetail projections disposed parallel to the central axis of the machine, and a magnetizable core mounted on said supporting members and composed of staggered segmental sections of laminations, each section comprising a punching as defined in claim 4.

11. A dynamo-electric machine having a stator member comprising a plurality of equally spaced supporting members constituting elongated dovetail projections disposed at equal distances from the central axis of the machine and parallel thereto, and a magnetizable core mounted on said supporting members and composed of staggered segmental sections of laminations, each section comprising a punching as defined in claim 4.

12. A dynamo-electric machine having a plurality of spaced supporting members constituting elongated dovetail projections disposed parallel to the central axis of the machine, and a magnetizable core mounted on said supporting members and composed of staggered segmental sections of laminations, each section comprising a punching as defined in claim 5.

13. A dynamo-electric machine having a stator member comprising a plurality of equally spaced supporting members constituting elongated dovetail projections disposed at equal distances from the central axis of the machine and parallel thereto, and a magnetizable core mounted on said supporting members and composed of staggered segmental sections of laminations, each section comprising a punching as defined in claim 5.

14. A dynamo-electric machine having a plurality of spaced supporting members constituting elongated dovetail projections disposed parallel to the central axis of the machine, and a magnetizable core mounted on said supporting members and composed of staggered segmental sections of laminations, each section comprising a punching as defined in claim 6.

15. A dynamo-electric machine having a stator member comprising a plurality of equally spaced supporting members constituting elongated dovetail projections disposed at equal distances from the central axis of the machine and parallel thereto, and a magnetizable core mounted on said supporting members and composed of staggered segmental sections of lamentations, each section comprising a punching as defined in claim 6, the winding-receiving means being substantially at the inner periphery of the stator core.

16. A dynamo-electric machine having a plurality of spaced supporting members constituting elongated dovetail projections disposed parallel to the central axis of the machine, and a magnetizable core mounted on said supporting members and composed of staggered segmental sections of laminations, each section comprising a punching as defined in claim 7.

17. A dynamo-electric machine having a stator member comprising a plurality of equally spaced supporting members constituting elongated dovetail projections disposed at equal distances from the central axis of the machine and parallel thereto, and a magnetizable core mounted on said supporting members and composed of staggered segmental sections of laminations, each section comprising a punching as defined in claim 7, the winding-receiving means being substantially at the inner periphery of the stator core.

In testimony whereof, I have hereunto subscribed my name this 12th day of June, 1928.

THOMAS M. NODEN.